Dec. 5, 1967 R. BUENGER 3,355,821

LOGICAL DEVICE

Filed March 25, 1965 12 Sheets-Sheet 1

Dec. 5, 1967 R. BUENGER 3,355,821

LOGICAL DEVICE

Filed March 25, 1965 12 Sheets-Sheet 6

Dec. 5, 1967 R. BUENGER 3,355,821

LOGICAL DEVICE

Filed March 25, 1965 12 Sheets-Sheet 8

3,355,821

LOGICAL DEVICE

Raymond Buenger, La Habra, Calif. (161 E. Orangethrope, Apt. 83, Placentia, Calif. 92670)

Filed Mar. 25, 1965, Ser. No. 442,739
10 Claims. (Cl. 35—30)

This invention relates to a logical device and more particularly to such a device of simple construction for performing logical operations.

There are various devices for performing logical operations. Electronic, electro-mechanical and mechanical digital computers are examples. Logical devices employed in computers and components thereof generally comprise apparatus capable of two or more states of operation exhibiting mutually exclusive conditions, such as, on-off, yes-no, one-zero, etc. Most logical devices are relatively complex and costly and require many parts for their construction.

The present invention relates to a relatively simple logical device which may be of simple and inexpensive construction and which may be used for performing various logical operations, such as, converting a number in one base system to another for teaching the principles involved, playing logical games, etc.

The methods for converting from one base system to another are well known mathematically. It is well known to those skilled in mathematics and in binary logic that the decimal system of numbers involves the base ten system and the binary system of numbers involves the base two system. That is, the decimal number 136 is equal to $10^2 \times 1$ plus $10^1 \times 3$ plus $10^0 \times 6$. This simplifies to $100 \times 1$ plus $10 \times 3$ plus $1 \times 6$. The equivalent number in another base system, such as the base two system, or the binary system of notation, is 10001000. This binary number is derived from $2^7 \times 1$ plus $2^6 \times 0$ plus $2^5 \times 0$ plus $2^4 \times 0$ plus $2^3 \times 1$ plus $2^2 \times 0$ plus $2^1 \times 0$ plus $2^0 \times 0$. This simplifies to $128 \times 1$ plus $64 \times 0$ plus $32 \times 0$ plus $16 \times 0$ plus $8 \times 1$ plus $4 \times 0$ plus $2 \times 0$ plus $1 \times 0$. Another commonly used numerical system in current day logic employed in digital computers, for example, is the octal system of notation, or the base eight system. The decimal number 136 is 210 in the octal system. The number 210 in the octal system is converted to its decimal equivalent thus: $8^2 \times 2$ plus $8^1 \times 1$ plus $8^0 \times 0$, which simplifies to $64 \times 2$ plus $8 \times 1$ plus $1 \times 0$.

The conversion of a number in one base system to a number in a different base system thus, is relatively simple if the basic rules are understood. However, such a conversion frequently becomes relatively confusing to the layman, and a means or device for visually indicating such a conversion greatly aids one in appreciating the mathematical relationships involved. It is presently quite desirable at least to be able to present the mathematical concepts involved in binary (and similar systems of notation currently used in electronic logic systems) to decimal conversion.

Accordingly, it is an object of the present invention to provide a logical device of simple and inexpensive construction.

It is an additional object of the present invention to provide a logical device for converting a number in one base system to its corresponding number in a different base system and wherein the construction thereof is relatively simple and inexpensive.

Another object of the present invention is to provide a logical device for converting a number in one base system to its corresponding number in a different base system which may be used for instructional purposes.

It is another object of this invention to provide a converting device or calculator which is of simple construction involving but a relatively few parts whereby the device may be manufactured at low cost.

It is an additional object of the present invention to provide a numerical base conversion device of simple and inexpensive construction which may be used for solving logical problems.

These and other objects of the present invention will become apparent from a consideration of the following detailed description taken in connection with the accompanying drawings in which.

Figure 1:
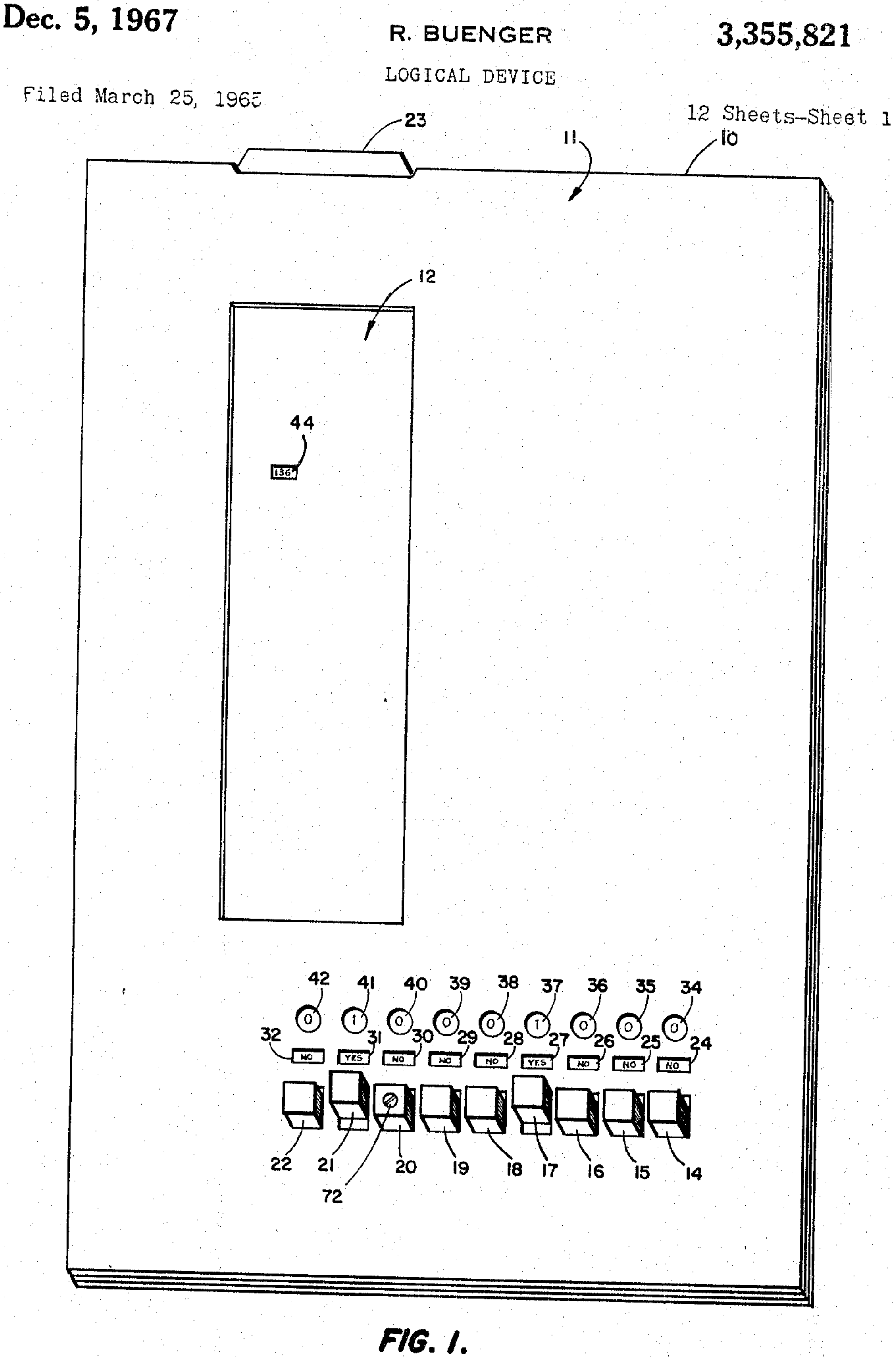
FIG. 1 is a front elevation of a logical device embodying the principles of the present invention.
Figure 3:
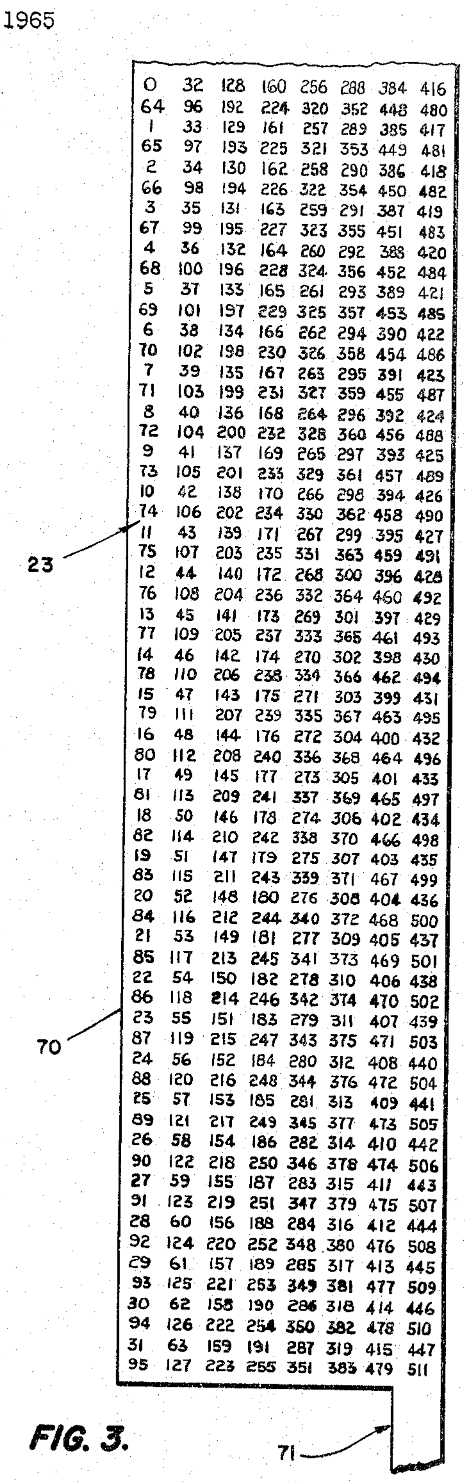
FIG. 3 illustrates the numerical memory used for numerical base conversion of the device shown in FIGS. 1 and 2.
Figure 4A:
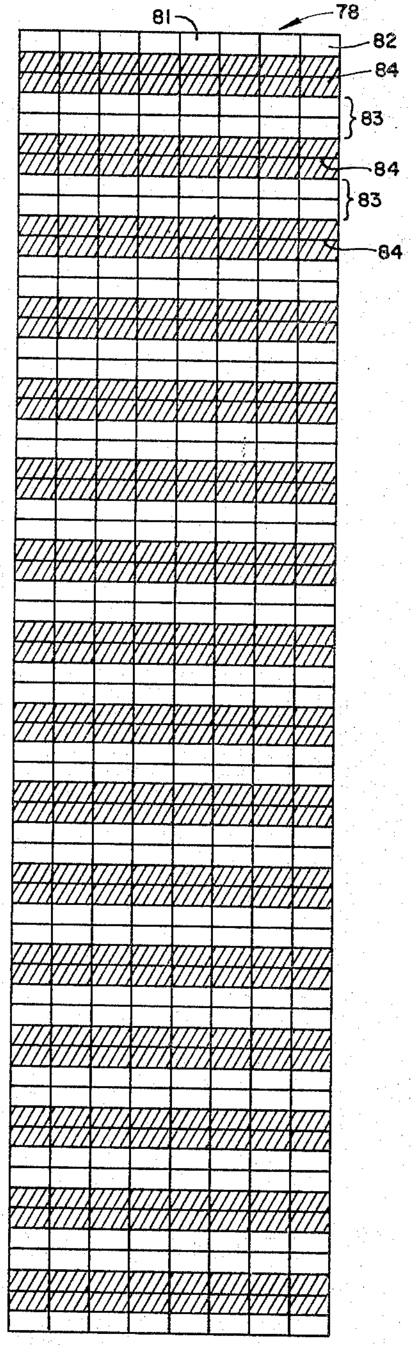
Figure 4B:
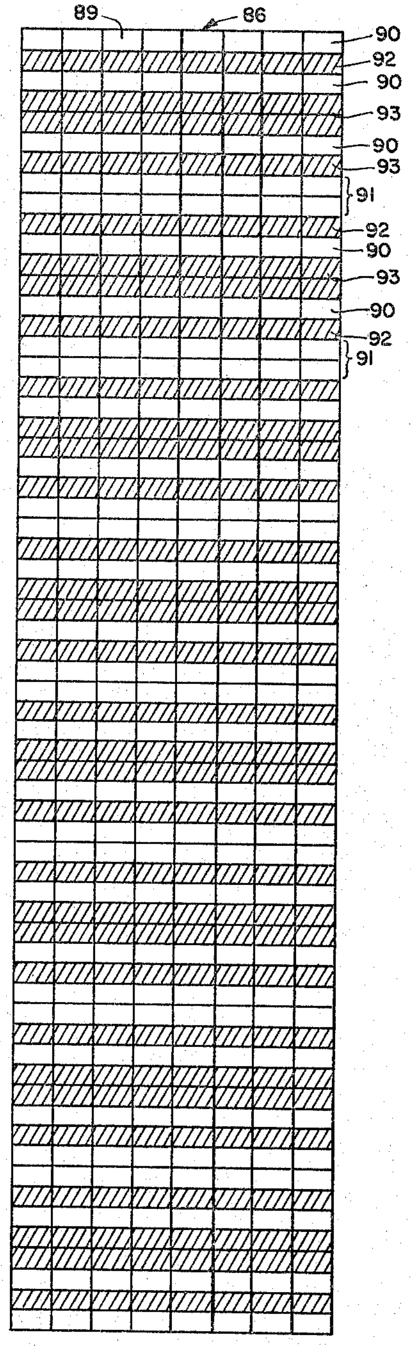
Figure 4C:
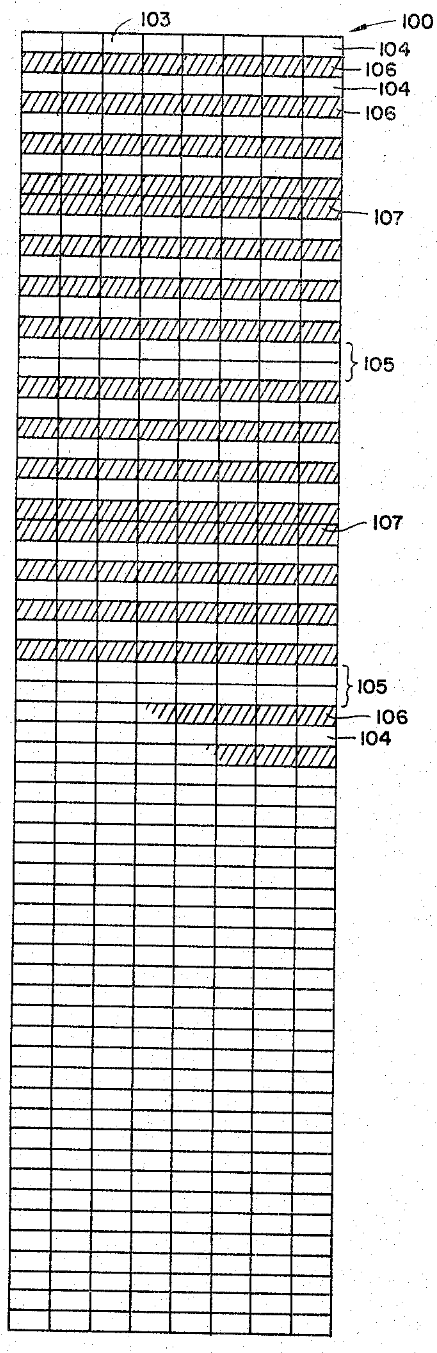
Figure 4D:
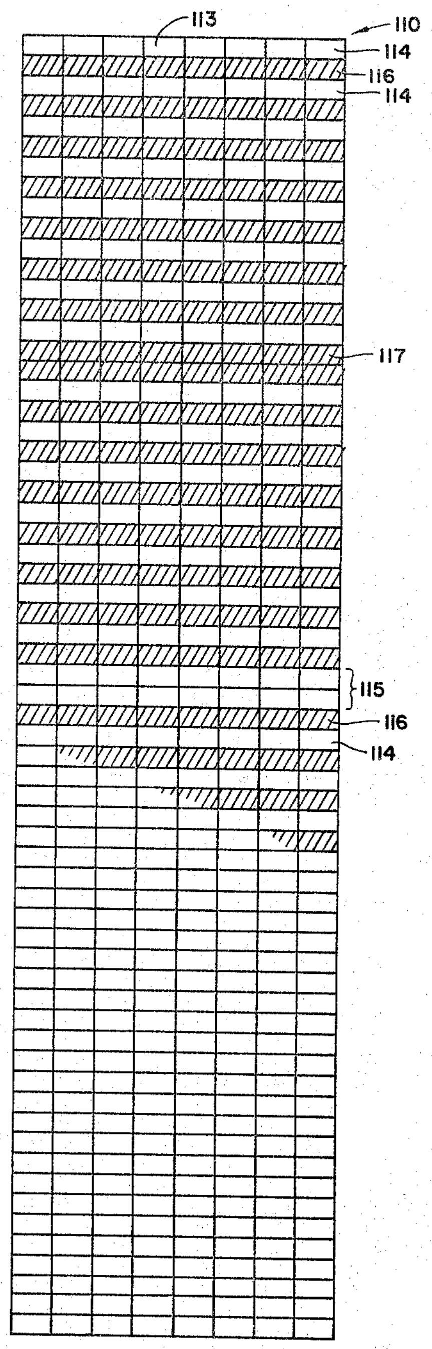
Figure 4E:
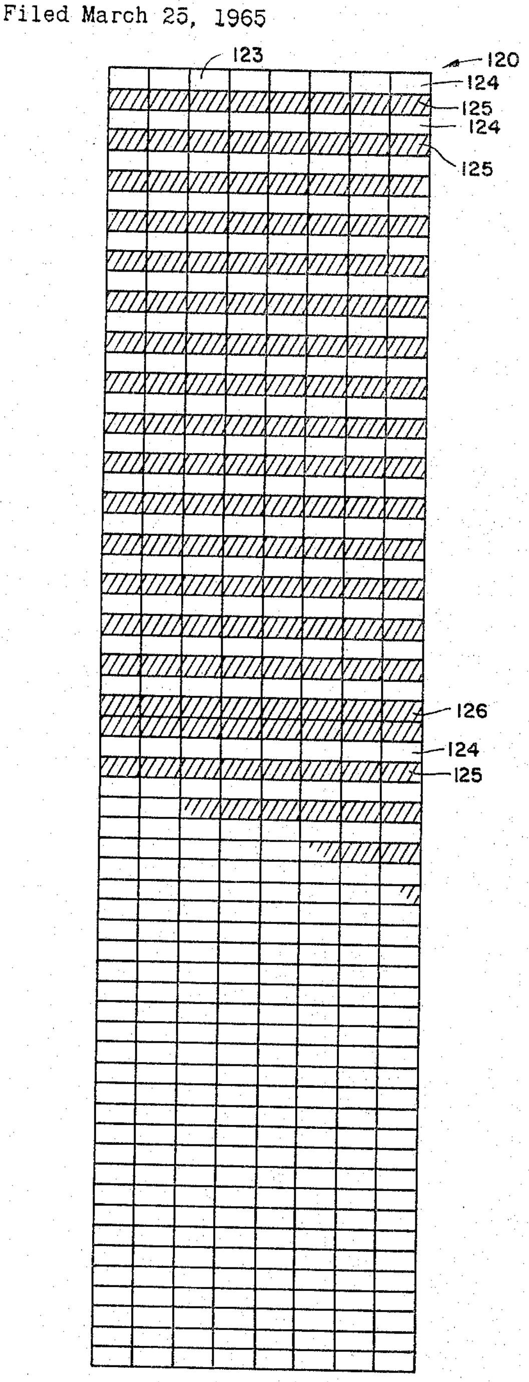
Figure 4F:
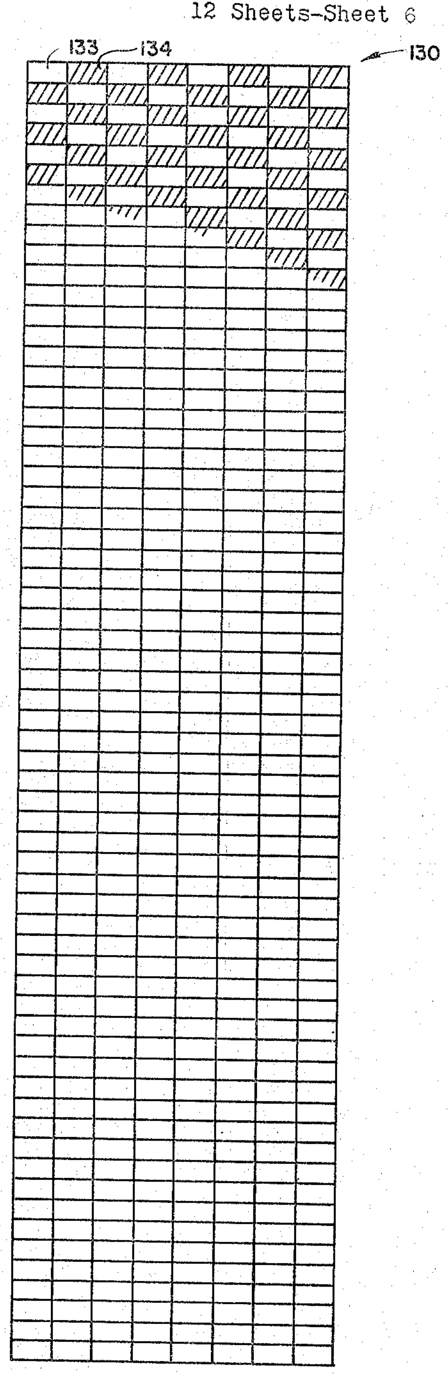
Figure 4G:
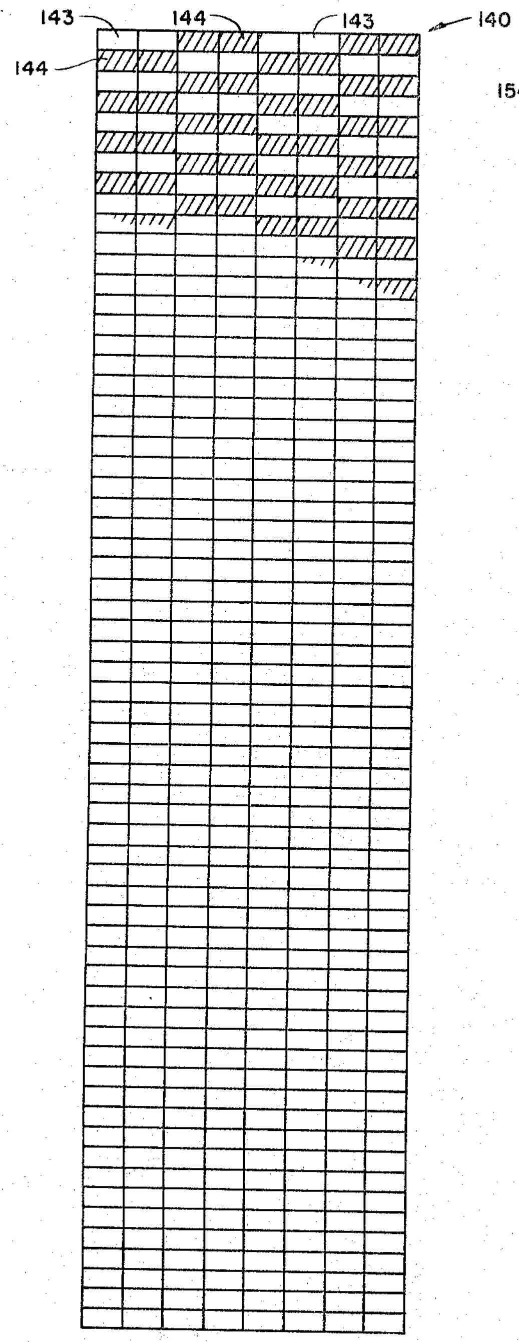
Figure 4H:
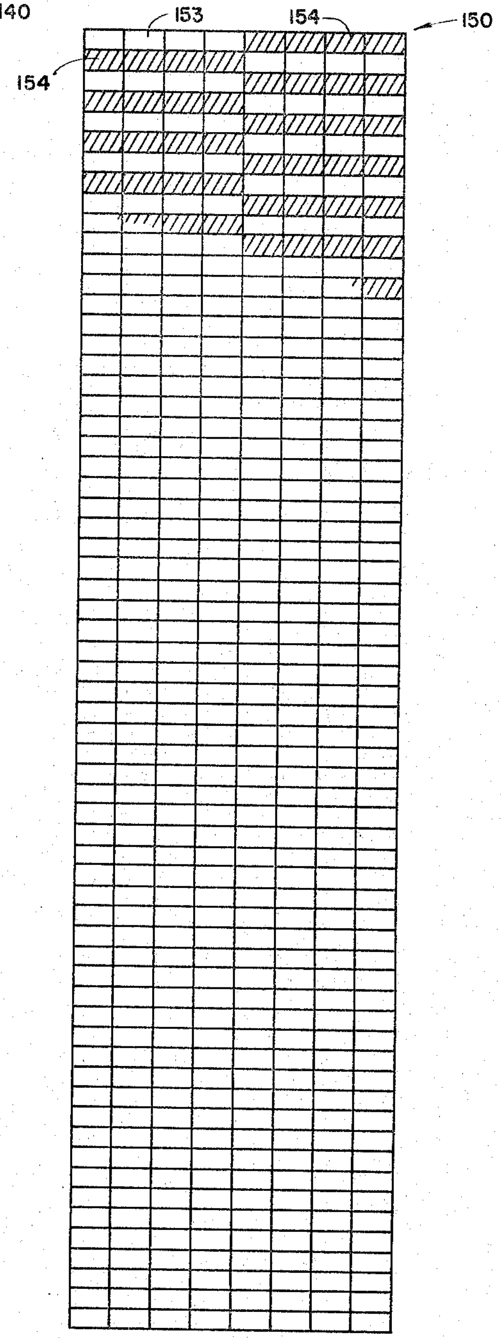
Figure 5:
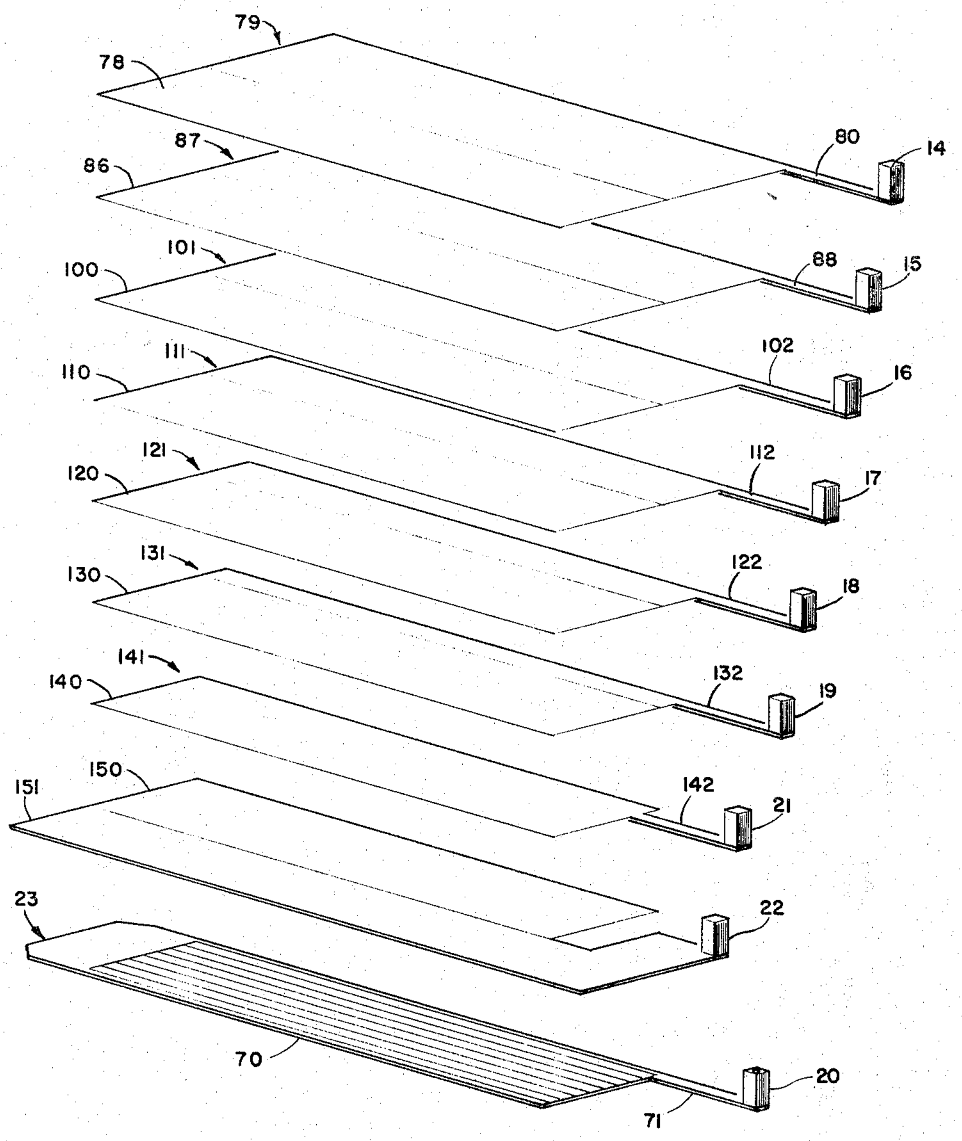
Figure 6A:
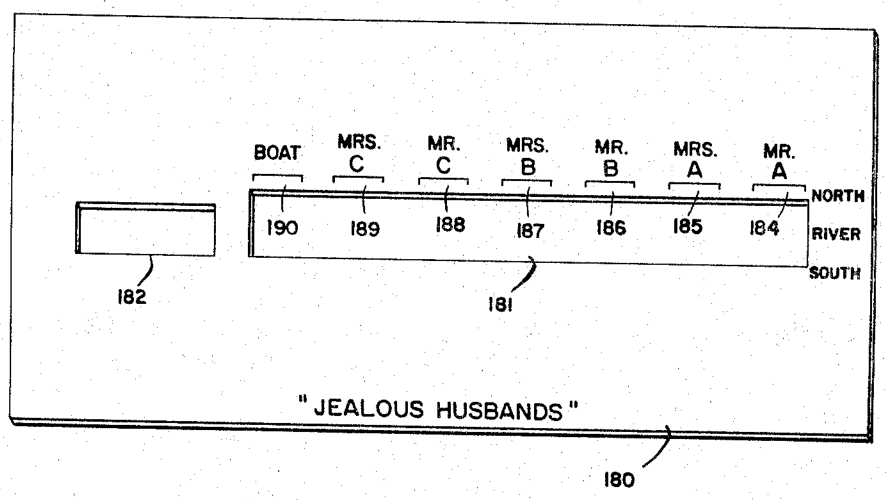
Figure 6B:
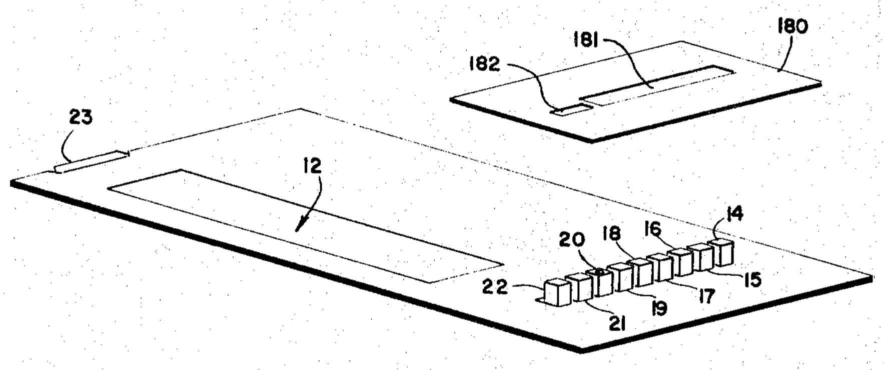
Figure 6C:
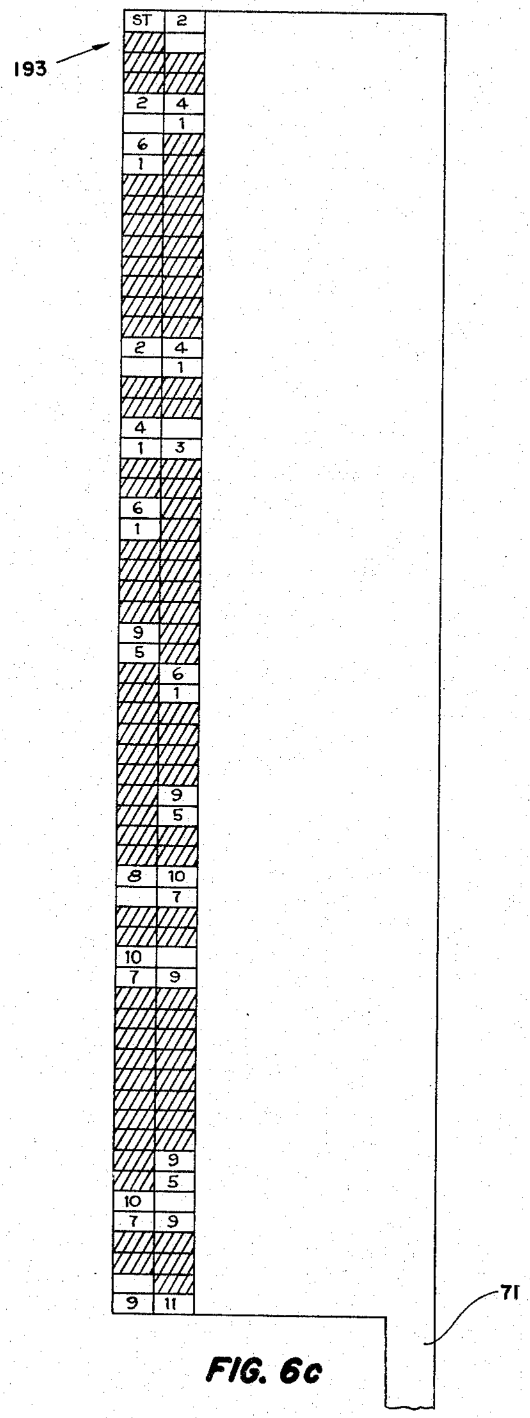
Figure 7A:
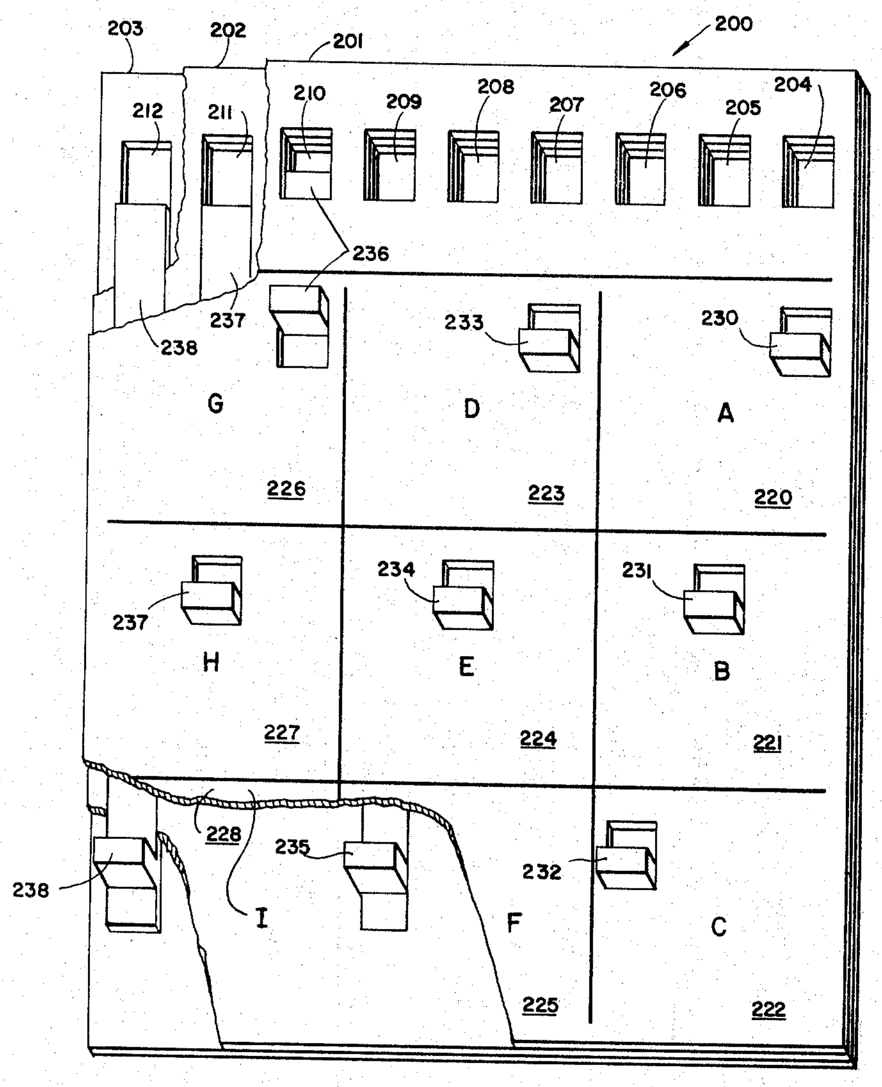
Figure 7B:
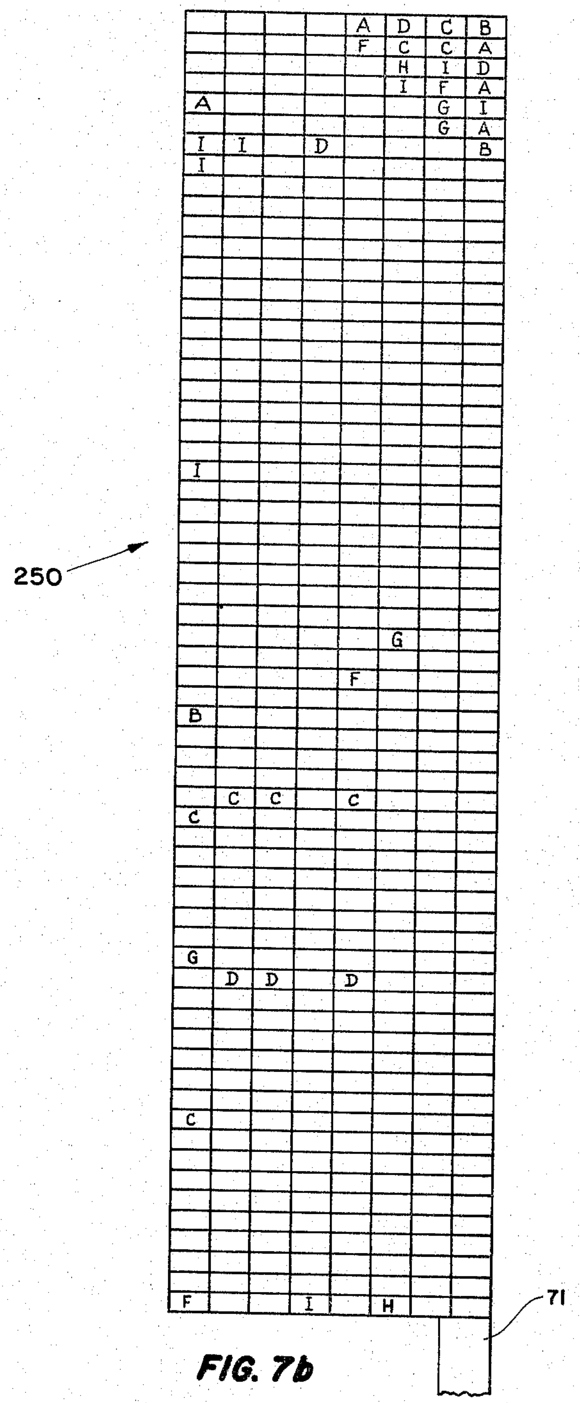

FIGS. 4*a* through 4*h* illustrate masks employed in the device of FIG. 1;

FIG. 5 is a diagrammatic illustration of the manner in which the masks of FIGS. 4*a* through 4*h* and the numerical memory of FIG. 3 are physically arranged in a stacked relationship;

FIGS. 6*a* through 6*c* illustrate the manner in which a device constructed according to the teachings of the present invention may be utilized for solving a logical problem; and FIGS. 7*a* and 7*b* illustrate another manner in which a device constructed in accordance with the teachings of the present invention may be utilized in solving a logical problem.

According to a specific exemplary embodiment of the teachings of the present invention, a logical device which may be used for performing various logical operations, such as converting a numeral in one base system to its corresponding numeral in a different base system, is provided. This device may be constructed from various materials such as heavy paper, cardboard, plastic, metal, etc., and may be formed in a relatively thin rectilinear structure with vertically, and as desired horizontally, slidable strips which selectively position various masks and a numerical or indicia-bearing memory. The device is constructed basically of such slidable strips to which are attached overlaying masks which in turn overlay a memory having thereon various indicia such as numerals, letters and the like. By selectively positioning the slidable strips, the respectively attached masks are positioned whereby one or more particular indicia on the memory are exposed to view. For example, the slidable members may be positioned in a binary logical relationship to expose various decimal numerals on the memory for converting binary numbers to decimal numbers. In a similar manner, the slidable members may be selectively position in a "go-no-go" or "yes-no" relationship to expose various indicia on the memory in solving a selected problem or in playing logical games.

Referring now to FIG. 1, a logical device constructed in accordance with the teachings of the present invention is disclosed. The device includes generally a base 10 having a cover 11 with an elongated opening 12 therein. A plurality of positioning members in the form of knobs 14 through 22, or the like, are provided for selectively positioning masks (not shown in FIG. 1) and a memory 23 within the conversion device shown in FIG. 1. Immediately above each of the knobs 14 through 22 there are provided a plurality of respective small rectangular openings 24 through 32 for exposing indicia such as "yes-no," "go-no-go" or "on-off" indicia representative of the position of the knobs. Immediately above the small rectangular openings 24 through 32 are respective circular openings 34 through 42 for further displaying indicia, such as the binary digits 0 and 1, indicative of the position of the respective knobs 14 through 22.

Each of the knobs 14 through 22 may, for example, represent a binary flip-flop. It will be noted that in FIG. 1, each of the knobs 14, 15, 16, 18, 19, 20 and 22 are in their lower positions thereby representing binary "zeros" as may be viewed through the respective circular openings 34, 35, 36, 38, 39, 40 and 42. The knobs 17 and 21 are in their upper positions representing binary "ones" as may be viewed in the respective circular openings 37 and 41. Thus, the positions of the knobs 14 through 22 represent the binary number 010001000 (reading from left to right as shown in FIG. 1) thereby exposing the equivalent decimal number 136 in a window 44 within the opening 12 of the cover 11. Actually, the masks, which will be discussed in greater detail subsequently, are within the conversion device shown in FIG. 1 under the opening 12. As the various masks (of which there are eight as will be described later) are selectively positioned by the knobs 14 through 22, a single window 44 somewhere within the opening 12 is created thereby exposing a selected numeral or other indicia.

Figure 2:
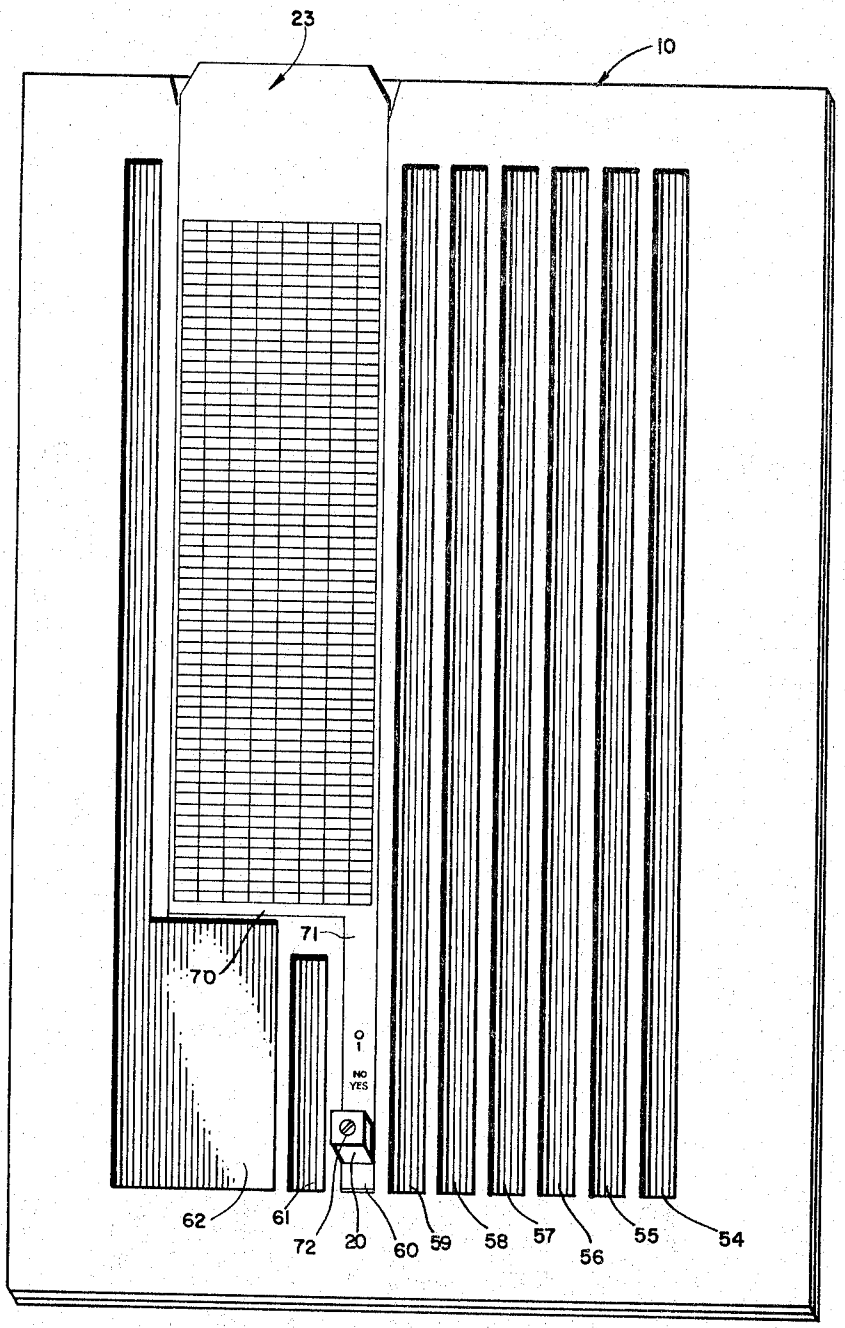
FIG. 2 is a view of the device shown in FIG. 1 with the front cover, and certain other elements, removed therefrom.

Turning now to FIG. 2, which will be discussed in detail along with FIGS. 3, 4*a* through 4*h* and 5, a view of the logical device of FIG. 1 is shown with the cover 11 and the various masks (shown in FIGS. 4*a* through 4*h* and to be discussed subsequently) removed. The base 10 includes a plurality of parallel recesses 54 through 62 for receiving sliding members which will be described in greater detail in conjunction with the discussion of FIG. 5. The recesses 54 through 62 receive, and maintain in substantially parallel relationship, the sliding members. The masks and memory are attached to the sliding members for longitudinal movement within the recesses 54 through 62. The knobs 14 through 22 are affixed to the sliding members for manually controlling the movement thereof.

The memory 23 is exposed in FIG. 2 and includes an elongated sheet 70 which may be fashioned from any suitable material, such as paper, cardboard, wood, plastic, metal, etc., and a sliding member 71 to which the knob 20 is attached by a suitable fastening means, such as a screw 72. As will be apparent subsequently, it is desirable that the knob 20 be readily removable from the memory 23 such that the memory may be removed from the logical device for inserting a similar memory having different indicia thereon. The memory 23 is moved up or down by means of the knob 20 in performing logical or conversion operations.

A suitable memory 23 for performing binary to decimal conversion is shown in greater detail in FIG. 3. As is shown in this figure, the elongated member 70 of the memory 23 has imprinted thereon decimal numerals 0 through 511. It will be appreciated that the maximum decimal numeral is 511 because the maximum capability of the conversion device shown in FIG. 1 is nine binary places. Total decimal capability is equal to $$(2^8)+(2^7)+(2^6)+(2^5)+(2^4)+(2^3)+(2^2)+(2^1)+(2^0)=511$$

Note that there is a decimal difference of 64 of adjacent numerals in each vertical column. That is, in the leftmost column there are imprinted the numerals 0, 64, 1, 65, 2, 66, 3, etc. Note also, that adjacent numerals in horizontal rows differ by either 32 or 96. That is, taking the uppermost row, the numerals are 0, 32, 128, 160, 256, 288, 384 and 416.

Turning now to FIGS. 4*a* through 4*h* and FIG. 5, the various masks which are employed in the logical device shown in FIG. 1 are shown in detail in FIGS. 4*a* through 4*h*, and the stacking relationship thereof with respect to the memory 23 is shown in FIG. 5. A mask 78 is shown in FIG. 4*a*, and this mask may be imprinted on a sheet 79 (FIG. 5) which is firmly attached to a sliding member 80. The knob 14 is affixed to the sliding member 80.

The sheet 79 may be made from any suitable material, such as clear plastic, with the mask 78 being provided by any suitable method, such as photographically, by inking, by printing, etc. The mask 78 is essentially divided into five hundred and twelve rectangular segments 81 which correspond to the five hundred and twelve indicia (0 through 511) imprinted on the memory 23 as exemplarily illustrated in FIG. 3. It will be noted that the mask 78 includes a repetitive pattern of a plurality of transparent sections or rows 82 and 83 and a plurality of substantially opaque rows 84.

A mask 86 is illustrated in detail in FIG. 4*b*, and this mask may be suitably imprinted on a sheet 87 (FIG. 5) which is attached through a sliding member 88 to the knob 15. The mask 86 is likewise divided into 512 rectangular segments 89. The mask 86 includes a plurality of transparent rows 90, transparent double rows 91, substantially opaque rows 92 and substantially opaque double rows 93. It will be appreciated that the pattern of transparent and opaque rows is repetitive. That is, there is provided a transparent row 90, a substantially opaque row 92, a transparent row 90, a substantially opaque double row 93, a transparent row 90, a substantially opaque row 93, a transparent double row 91, a substantially opaque row 92, a transparent row 90, a substantially opaque double row 93, etc.

A mask 100 is shown in FIG. 4*c*. The mask 100 is formed on a sheet 101 which is connected through a slidable member 102 to the knob 16. The mask 100 includes 512 segments 103. The mask 100 is formed into transparent rows 104 and transparent double rows 105, and substantially opaque rows 106 and opaque double rows 107.

A mask 110 is shown in FIG. 4*d*, and this mask is formed on a sheet 111 which is firmly attached to a sliding member 112. The knob 17 is affixed to the sliding member 112. The mask 110 also, for convenience, may be considered as being divided into 512 segments 113. Mask 110 includes transparent rows 114, and a transparent double row 115. The mask 110 also includes substantially opaque rows 116 and opaque double rows 117.

A mask 120 is illustrated in detail in FIG. 4*e*. The mask 120 may be formed on a sheet 121 and affixed by means of a sliding member 122 to the knob 18. The mask 120 may be considered as including 512 segments 123 and includes a plurality of transparent rows 124, a plurality of opaque rows 125 and an opaque double row 126.

A mask 130 is shown in FIG. 4*f*, and this mask may be formed on a sheet 131 which is affixed through a sliding member 132 to the knob 19. The mask 130 is divided into 512 segments. Transparent segments 133 alternate with substantially opaque segments 134.

A mask 140 is shown in FIG. 4*g*, and may be formed on a sheet 141 and attached through a sliding member 142 to the knob 21. The mask 140 may be considered as including 512 segments, with double segments 143 being transparent and alternating with substantially opaque double segments 144.

A mask 150 is shown in FIG. 4*h*, and may be formed on a sheet 151 which also may serve as a sliding member. The sliding member or sheet 151 is attached to the knob 22. The mask 150 likewise may be considered as including 512 segments, with quadruple segments 153 being transparent and alternating with substantially opaque quadruple segments 154.

The stacking arrangement of the memory 23, which is illustrated in detail in FIG. 3, with respect to the masks 78, 86, 100, 110, 120, 130, 140 and 150 is shown in FIG. 5. Each of the masks is arranged such that it is aligned with the memory 23, with the mask 150 being directly adjacent the memory 23, the mask 140 being directly adjacent the mask 150, the mask 130 being directly adjacent the mask 140, etc. The sliding members 80, 88, 102, 112, 122, 132, 142, 151, and 71 fit into respective recesses (FIG. 2) 54, 55, 56, 57 58, 59, 61, 62 and 60.

It should be noted that each mask contains 256 transparent segments and 256 opaque segments arranged in different patterns. The patterns are arranged such that each mask, when all the masks are in a common position, covers one-half of the indicia on memory 23 that may be seen through the transparent segments of the next adjacent mask. That is, mask 150 blocks one-half of the indicia on memory 23 leaving one-half or 256 indicia exposed; mask 140 blocks one-half of the remaining half leaving 178 indicia exposed; and mask 130 blocks one-half of the remaining half leaving 86 indicia exposed, etc. The relationships of the various transparent and substantially opaque sections of the various masks are such that only a single indicia on the memory 23 (FIG. 3) is exposed for any one of the various binary positions of the knobs 14 through 22 (FIG. 1). By making the memory 23 movable between two positions, the capacity of the logical device of the present invention is doubled. It will be appreciated, that fewer or greater masks may be provided along with a fixed, or movable, memory. Likewise, for conversions between different numerical systems, more that two positions for the various masks may be provided.

FIGS. 6*a* through 6*c* illustrate a structural arrangement whereby the apparatus previously described may be utilized in playing a game in which logical decisions are involved. An overlay 180 having slots 181 and 182 is provided for positioning over the knobs 14 through 22 of the logical device shown in FIG. 6*b*. FIG. 6*b* illustrates the manner in which the overlay 180 of FIG. 6*a* is to be positioned over the logical device (like that shown in FIG. 1). It will be noted that the height of the slot 182 is smaller than the height of the slot 181. The slot 182 is thus constructed smaller so as to prevent the movement of the knobs 21 and 22; whereas, the slot 181 is larger to allow the knobs 14 through 20 to freely move between their two positions. The slot 181 is labeled as being divided into seven sections 184 through 190. These seven sections correspond to the knobs 14 through 20, and the labels correspond to individuals and an object involved in the well-known game called "jealous husbands."

FIG. 6*c* illustrates a memory 193 (which corresponds in structure to the memory 23 shown in FIG. 3) which may be utilized in playing this particular game. The memory 193 may be inserted into the device shown in FIG. 6*b* (note also FIG. 1) by removing the screw 72 so as to allow the memory 23 to be removed from the logical device. The memory 193 is inserted in place of the memory 23, and the knob 20 is again fastened thereto by the screw 72. It will be noted that this particular game requires only one-fourth of the capacity of the memory 193 shown in FIG. 6*c*. The cross-hatched squares are considered unsafe; whereas the blank squares are considered safe. The numbered squares indicate the number of the move when crossing from the south side to the north side of the river. The blank squares are safe, but do not aid in completing the game in the least number of moves. The square "ST" indicates the starting position. It should be noted that the game can be played in reverse, that is, the river may be crossed from the north side to the south side and in this case the numbered squares would be of a reverse order.

This game of "jealous husbands" is a classical logic game. Three couples, Mr. and Mrs. A, Mr. and Mrs. B, and Mr. and Mrs. C and a boat start on the south side of the river. The boat only hold two people, and one person or more must return in the boat. No wife can be on a side of the river opposite to that on which her husband is located if another man is present, even if the latter man's wife is present.

In playing the game with the apparatus shown in FIGS. 6*a* through 6*c* (and FIG.1), a knob 14 through 20 is moved up to cross the river from south to north and down to cross the river from north to south. Eleven is the fewest number of moves in which this game can be completed. The apparatus of the present invention can be utilized to play this game in the simplest manner possible. When the correct move is made, the number of the move will be visible from the memory 193 through a window (such as the window 44 in FIG. 1). If an incorrect move is made a blank segment will be visible.

Apparatus is shown in FIGS. 7*a* and 7*b* for use in conjunction with the logical device of FIG. 1 for playing the familiar game of "tic tac toe." An overlay or cover 200 is shown in FIG. 7*a* which may be positioned over the logical device shown in FIG. 1. The cover includes a top 201, spacer 202 and base 203. Nine slots 204 through 212 are provided. The cover 200 may be positioned over the logical device in FIG. 1 such that the knobs 14 through 22 project through the respective slots 204 through 212 whereby these knobs are free to move back and forth in these slots.

The top 201 is laid out in the form of the tic tac toe game, and includes six squares A, B, C, D, E, F, G, H, I identified by reference numerals 220 through 228. Sliders 230 through 238 are provided for actuating respective knobs 14 through 22 which are to be located within the respective slots 204 through 212. As can be seen from FIG. 7*a*, these sliders include a knob member which is affixed to a longitudinal member which in turn abuts a respective one of the knobs 14 through 22 in FIG. 1.

FIG. 7*b* illustrates a memory 250 which may be used in place of the memory 23 in FIG. 1 in playing the game of "tic tac toe." It will be noted that letters appear within segments of the memory 250. These letters correspond to the squares 220 through 228 and indicate the move that the logical device will make in playing with a human player. Only some of these segments of the memory 250 have been filled with letters for purposes of illustration.

In a first example, the logical device moves first. The player picks any move for the logical device except the center square E, numeral 224. For example, assume that the player selects square A and moves the slider 230 to its upper position as the device's first move. Next, assume that the player selects square E and moves the slider 234 to its upper position. The device's next move is indicated by the memory (through a window such as 44 shown in FIG. 1) and this may indicate square B and thus the slider 231 should be moved for the device's play. The player chooses square C and moves the slider 232, and the memory indicates the device's move which may be square G and hence the slider 236. The player then selects square D and moves slider 233, and the memory indicates square F and the slider 235 should be moved for the logical device's move. The player then moves the slider 237 (square H), and the logical device's move is indicated as square I, and thus, the slider 238. Thus it will be seen that the player could not win this game.

In another example, the first move may be in the center square E and be that of the logical device. In this case, for example, the slider 234 is not moved for the move but remains stationary. Assume, that the player selects square B and moves the slider 231. The memory indicates that square A is the next move for the logical device and the slider 230 is moved. If the player selects square I and moves the slider 238, the next move indicated for the logical device is the square D (slider 233). If the player then selects square F and moves the slider 235, the next move indicated for the logical device is the square G (slider 236) allowing the logical device to win the game.

It will be appreciated that although the memory 23 of the logical apparatus of the present invention has been shown as movable in an up and down relationship, a similar or wider memory could be provided which may be moved horizontally to increase the capacity of the present logical device. That is, for example, the memory 23 may be numbered so as to increase the decimal numeral exposed in the window 44 by $2^n$, such as 16. Thus, with four knobs (and associated masks) the maximum decimal number available would be 15. The memory 23 could be moved horizontally in increments to increase :his capacity by 16 for each horizontal incremental movenent thereof.

It will be apparent that the logical device of the present nvention serves many purposes in performing various .ogical operations, in teaching the conversion of a number .n one base system, to another, in playing numerous games, etc.

It will be understood that although exemplary embodinents of the present invention have been disclosed and liscussed, other structures and applications are possible and that the embodiments disclosed may be subjected to various changes, modification and substitutions without necessarily departing from the spirit of the invention.

What is claimed is:

1. A logical device including a base for supporting a plurality of slidable members, the improvement comprising said slidable members being arranged in a substantially parallel fashion, a plurality of said slidable members having a coded mask affixed thereto for movement with its respective slidable member, the coding on each mask being different, one of said slidable members having thereon a plurality of indicia, said masks being arranged to overlay said indicia, and said slidable members being movable between a plurality of operable positions to allow at least one indicia to be exposed as a function of the position of said slidable members.

2. A logical device as in claim 1 wherein each of said masking means comprises a plurality of substantially opaque and transparent portions arranged in a coded fashion, and said indicia are arranged in a plurality of columns and rows.

3. A logical device as in claim 2 wherein said masks are each coded according to a different significance in the binary system of notation increasing upwards from a low order of $2^0$.

4. A logical device as in claim 2 wherein each of said slidable members has affixed thereto a knob member, and a cover is located over said slidable members and said masks, said cover having at least one aperture adjacent each knob member for exposing indicia on said slidable members indicative of the position thereof.

5. A logical device as in claim 2 wherein a cover member is located over at least a portion of said slidable members, said cover having indicia inscribed thereon relating to the significance of each slidable member.

6. A logical device as in claim 5 wherein said cover includes positioning members abutting at least certain of said slidable members for positioning said slidable members in accordance with the position of said positioning members.

7. A logical device including a base member and a plurality of slidable members, the improvement comprising said base member having formed therein a plurality of substantially parallel channels for receiving an equal number of slidable members therein, certain of said slidable members having coded masking means respectively attached thereto, one of said slidable members having a plurality of indicia thereon and at least two operable positions, each of said masking means comprising a plurality of substantially opaque and transparent portions arranged in coded fashion in rows and columns and overlaying said indicia whereby an indicia is exposed according to the position of said slidable members, and a cover attached to said base member and having an opening for allowing said indicia to be exposed to view.

8. A logical device as in claim 7 wherein each of said slidable members has affixed thereto a knob member, and said cover has a plurality of apertures therein allowing said knob members to extend therethrough for relative movement of said slidable members.

9. A logical device as in claim 7 wherein the opaque portions of a first of said masking means covers half of the available indicia on said one of said slidable members, the opaque portions of a second of said masking means covers half of the indicia exposed by said first masking means, and the opaque portions of a third of said masking means covers half of the indicia exposed by said second masking means.

10. A logical apparatus comprising:

a first member having a plurality of indicia thereon and movable between a plurality of operable positions;

a plurality of coded masks overlaying said first member and movable between a line plurality of positions;

each of said plurality of coded masks comprising a plurality of substantially opaque and transparent portions arranged such that one-half of the indicia exposed through the transparent portions of the next adjacent mask are covered by the opaque portions of the next overlaying mask.

References Cited

UNITED STATES PATENTS

| | | | |
|---|---|---|---|
| 2,046,239 | 6/1936 | Bardrof | 235—89 |
| 2,221,303 | 11/1940 | Shipley | 35—75 X |
| 2,460,563 | 2/1949 | Zelvin | 273—155 |
| 3,034,708 | 5/1962 | Bean | 235—89 X |
| 3,071,320 | 1/1963 | Scott. | |
| 3,083,906 | 4/1963 | Guintini | 235—89 |

EUGENE R. CAPOZIO, *Primary Examiner.*

W. GRIEB, *Assistant Examiner.*